(12) United States Patent
Kidalka et al.

(10) Patent No.: US 8,326,089 B2
(45) Date of Patent: Dec. 4, 2012

(54) METHOD FOR REPRESENTING A FILE STRUCTURE

(75) Inventors: Bernhard Kidalka, Viereth-Trunstadt (DE); Oliver Schreck, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 1412 days.

(21) Appl. No.: 10/893,658

(22) Filed: Jul. 16, 2004

(65) Prior Publication Data

US 2005/0015359 A1    Jan. 20, 2005

(30) Foreign Application Priority Data

Jul. 18, 2003   (DE) .................................. 103 32 831

(51) Int. Cl.
 *G06F 7/00* (2006.01)
(52) U.S. Cl. ........ 382/305; 382/128; 382/307; 345/530; 707/626; 707/634; 707/791; 707/800; 707/812; 715/700
(58) Field of Classification Search .................... 382/103
See application file for complete search history.

(56) References Cited

U.S. PATENT DOCUMENTS

| | | | | |
|---|---|---|---|---|
| 5,544,356 A * | 8/1996 | Robinson et al. | ............. | 707/821 |
| 5,634,050 A * | 5/1997 | Krueger et al. | ........................ | 1/1 |
| 6,672,212 B1 * | 1/2004 | Ferlitsch | ........................ | 101/484 |
| 6,734,880 B2 * | 5/2004 | Chang et al. | ................... | 715/738 |
| 7,059,721 B2 * | 6/2006 | Hayashi et al. | ................ | 351/206 |
| 2001/0049675 A1 | 12/2001 | Mandler et al. | | |
| 2002/0021828 A1 * | 2/2002 | Papier et al. | ................... | 382/128 |
| 2002/0087949 A1 * | 7/2002 | Golender et al. | ............. | 717/124 |
| 2002/0109735 A1 * | 8/2002 | Chang et al. | ................... | 345/853 |
| 2003/0056029 A1 * | 3/2003 | Huang et al. | ................... | 709/328 |
| 2004/0181536 A1 * | 9/2004 | Matsuura et al. | ............. | 707/100 |
| 2006/0242627 A1 * | 10/2006 | Wygodny et al. | ............. | 717/128 |

OTHER PUBLICATIONS

Information Visualisation, Tutorial Notes, Dr. Keith Andrews, Version of Jul. 5, 2002, IICM, pp. 1-36.

* cited by examiner

*Primary Examiner* — John Strege
(74) *Attorney, Agent, or Firm* — Schiff Hardin LLP

(57) ABSTRACT

A method is provided for displaying a concatenated file such as an image or text file that has been generated by combining information from other files. The concatenated file includes a file structure that can be shown on a display unit and that contains basic information and reference information. The reference information includes information about links of the concatenated file with source reference files which are also files of the file structure and are used for generating the concatenated file. The source reference files are automatically identified with the assistance of the reference information after the concatenated file has been selected. The source reference files and the concatenated file are subsequently displayed and accentuated at the display unit in an intelligent tree structure.

19 Claims, 3 Drawing Sheets

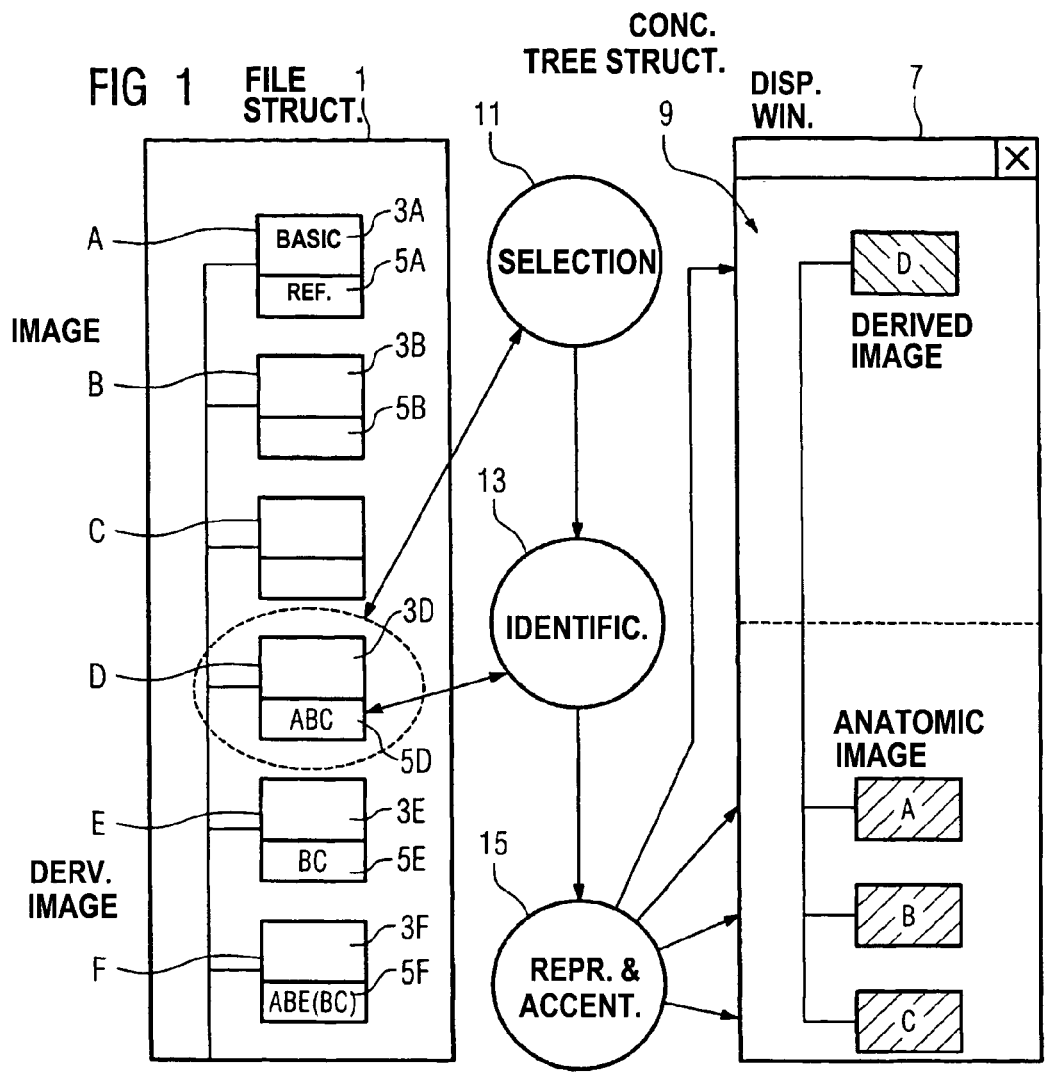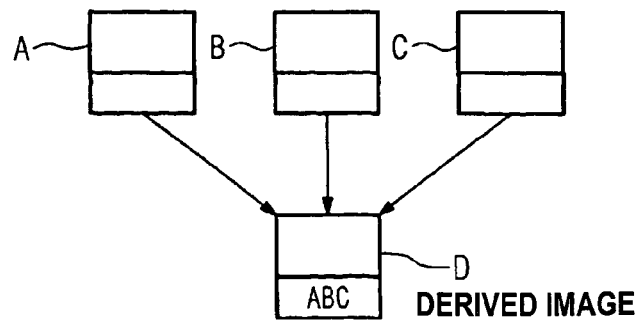

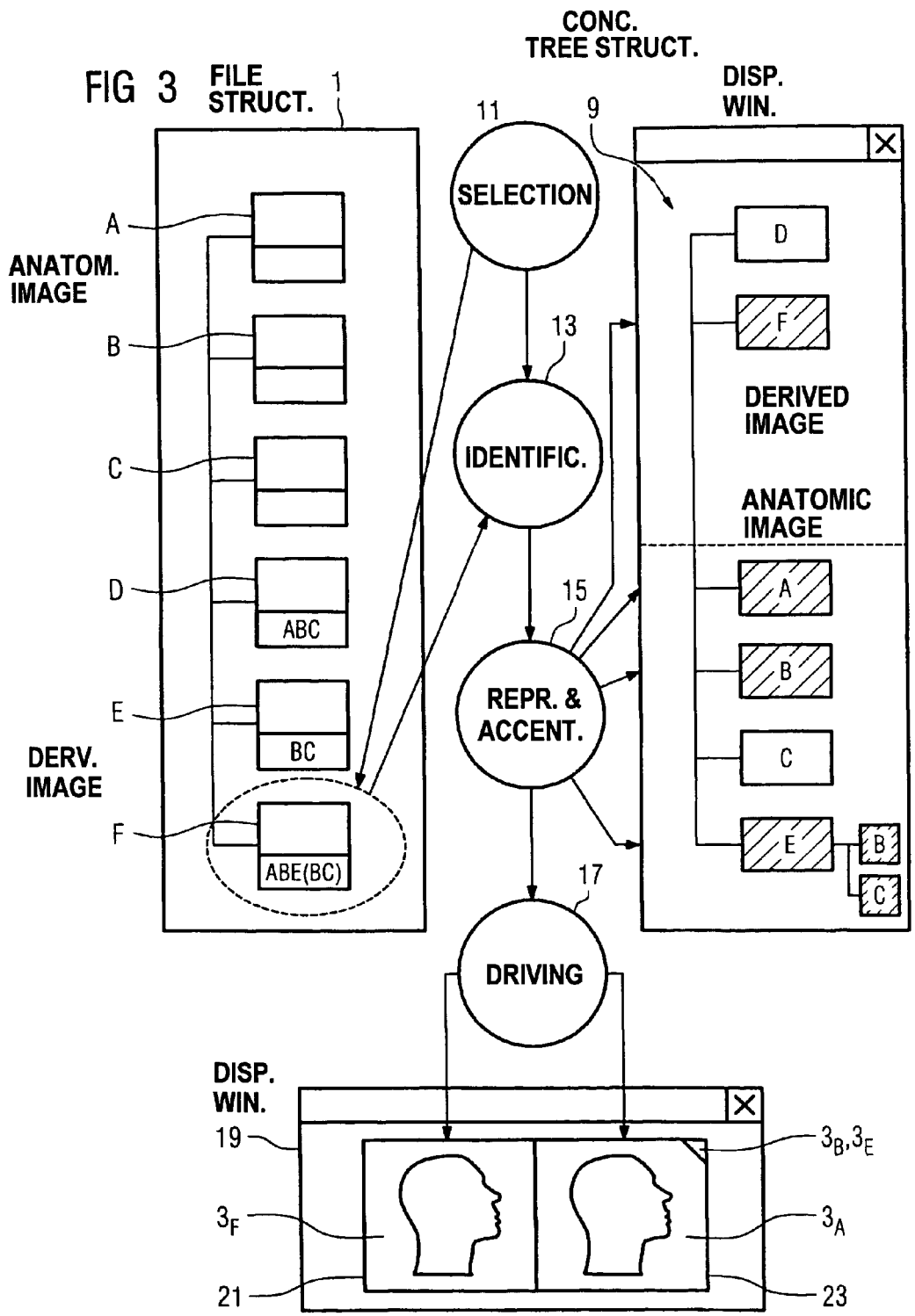

METHOD FOR REPRESENTING A FILE STRUCTURE

BACKGROUND OF THE INVENTION

The invention is directed generally to a method for representing a file structure on a display unit with the assistance of a tree structure and, more particularly, to a method in which a concatenated file includes a file structure that contains basic information and reference information, the reference information including information that links the concatenated files with source reference files which also are files of the file structure and were are used for generating the concatenated file.

Modern computer programs make it possible for a number of files (source reference files) to be processed into a new file. For example, pictures or other graphic elements or table elements from other files, which may have been generated with the assistance of other programs, can be integrated into a text document. Another example is image post processing in magnetic resonance tomography whereby "derived images" are generated from an arbitrary number of measured anatomic images, for example, by using different algorithms.

It is advantageous for specific applications to know the source reference files of the newly generated file. For example, for the evaluation of magnetic resonance images, it is necessary to know the anatomic images on which the derived images are based or to know that the images are based on already generated derived images. For this purpose, the DICOM medical image standard used in the medical technology defines a "Source Image Sequence" attribute which references all of the source reference images in the generated file of the parameter image.

It is a problem for a computer program to reasonably represent the links with the source reference files within the operator display. This is particularly problematic when a derived image, for example, is based on a large number of source reference files.

A possible solution for this problem, particularly with respect to applications in medical technology, for example, is to use image text which is superimposed onto the image during the visualization of an image. A great number of producers or manufacturers use this traditional course of action in order to display measuring parameters or general bits of information, for example. However, in instances having a large number of relevant source reference images, it becomes clear that the image text is useless since the information must be trimmed or cannot be represented due to a lack of space.

The representation of hierarchical arrangements of data files is shown with the assistance of, e.g., tree structure representations. For example, Microsoft provides the class CtreeCtrl in its class library "Microsoft Foundation Classes" (MFC) in order to visualize tree structures. Microsoft defines this class in the MSDN Library October 2001, for example. A "tree view control" is a window which represents hierarchical lists of entries such as document headlines, index entries or the documents or directories of a hard disk.

SUMMARY OF THE INVENTION

An object of the invention is to provide a method for clearly representing links to source reference files for a concatenated file within a file structure on a display unit that works well even for a large number of source references.

Given the aforementioned method for representing a file structure of a concatenated file, this object is achieved in that the source reference files, after the concatenated file has been selected, can be automatically identified with the assistance of the reference information, and the source reference files are represented and visually emphasized on the display device.

Therefore, the data files according to the inventive method have a format that is divided into basic information and reference information. Given medical image processing, the basic information contains the image information, i.e., the information that is necessary for representing a magnetic resonance image, for example. The reference information contains information about links between the data files of the file structure. The DICOM standard is an example for such a format.

According to various embodiments of the method, the reference information indicating the ties between the data files is used for also representing the links among the data files in the representation of the file structure. The representation of only one file with its source reference files corresponds to a link. If a number of files and their source reference files are represented, it is advantageous that the source reference files of the selected concatenated data file are distinguished from the other source reference files. A similar emphasis is also advantageous for the concatenated data file.

An advantage of the invention is that the links within the file structure are disclosed in a simple way. Another advantage is that an analysis of available information in a data file is used for automatically controlling the representation of the file structure.

In a particular embodiment, the representation and the accentuation occurs in a tree structure. Such a tree structure is a type of intelligent tree structure that analyses its entries and uses them for controlling further displays of data files in the tree structure. Such a tree structure can be realized with the assistance of the Microsoft class CtreeCtrl, for example. An advantage of such an adapted tree structure is that the mode of presentation and potential functionalities, such as drag & drop, unfolding of branches etc., are known. It also has the advantage that dependencies can be clearly summarized using the tree structure.

In an advantageous embodiment, the accentuation or emphasis is realized by the color of frames or background and/or is realized by underlining. This has the advantage that the data files can be allocated to one another in a simple way and that the emphasis can be programmed in a simple manner.

In a particularly advantageous embodiment, the basic information of a data file includes image information of an anatomic image from a medical examination device or it is image information of a derived image generated from one or more anatomic images, or it is image information of a derived image generated from one or more anatomic images and/or derived images.

In an advantageous embodiment, the data files are grouped into a file series, for example, the data files are multi-slice exposures from a magnetic resonance device. A multi-slice exposure is composed of a series of images of spatially offset slices. An advantage of the method is that the numerous different images of the multi-slice pickup can be handled and presented in a simple manner due to the representation of the links of the different file series with one another.

In an embodiment, the source reference files are represented and emphasized outside of the tree structure. This is advantageous, for example, when the file name itself, which is predominately used in a tree structure, is not as expressive or descriptive, for example, as a miniaturized representation or thumbnail image of the source reference files in a separate imaging space would be. A particular advantage is that such a representation situated outside the tree structure can be combined with the representation in the tree structure so that the links can be seen, and the miniaturized representations or even complete representations of the basic information, for example, can occur in the additional display areas.

In a further development, the tree structure is configured as a control element of a first and second display area of the display unit. For example, the basic information of the selected concatenated data file is shown as an update in the first display area and the basic information of the corresponding source reference files is shown as an update in the second display area.

In a further development, the second display area can be further divided in order to enable a number of source reference files to be shown simultaneously. A particular advantage is that the simultaneous representation of the basic information of the selected concatenated data file and the source reference files makes it possible to synchronously browse through a multiple file series, i.e., multi-slice exposures of a magnetic resonance device.

Further advantageous embodiments of the invention are described below.

DESCRIPTION OF THE DRAWINGS

A number of exemplary embodiments of the invention are explained on the basis of the following Figures.

FIG. 1 is a block flow diagram illustrating the inventive method in an exemplified manner as applied to the field of magnetic resonance tomography;

FIG. 2 is a block diagram showing an example in which a derived image has been generated from three anatomic images;

FIG. 3 is an extended block flow diagram illustrating a repetition of the method following the operating sequence described in FIG. 1, whereby an additional display area of a display unit is activated;

DETAILED DESCRIPTION OF THE PREFERRED EMBODIMENTS

Figure 4:
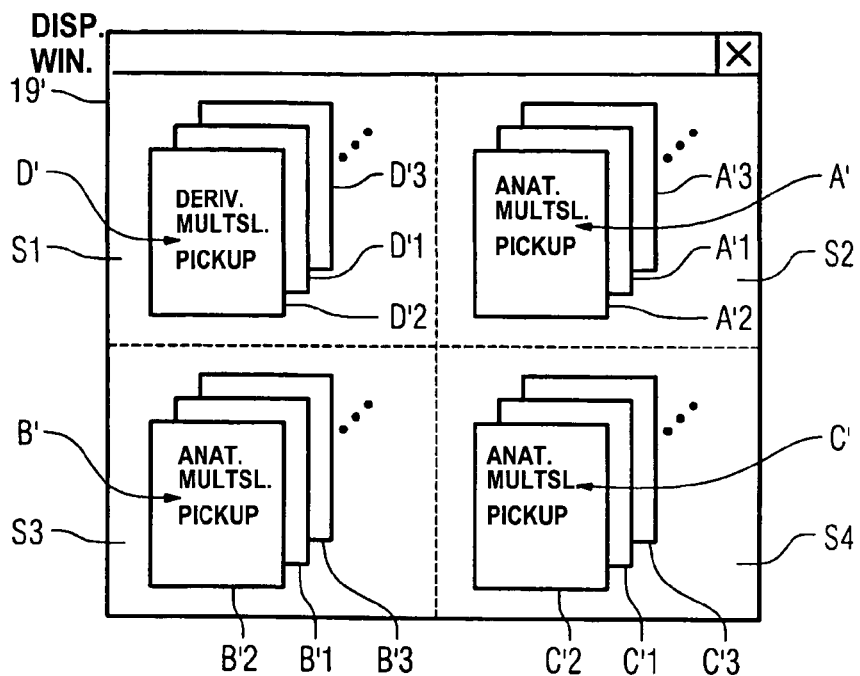
FIG. 4 is a pictorial diagram or screen shot of a display showing a further representation of basic information.

FIG. 1 shows an exemplary block flow diagram for explaining an embodiment the inventive method. The starting point is a file structure 1 which can be a database, for example. The file structure 1 has a number of entries of files A-F. The file structure 1 can be accessed, for example, with the assistance of a tree structure shown on a display device (for example, in the Windows Explorer program). The file names are normally represented in alphabetical order, but any order based on any criteria is possible.

The files A-F of the file structure 1 contain basic information 3A-3F and reference information 5A-5F. The basic information 3A-3F is the image information of a CT (computed tomography) image or magnetic resonance image or the text of a text file, for example. The reference information 5A-5F includes information about links of the respective file A-F with further files A-F of the file structure 1. These are the source reference files.

The DICOM standard is an example of a format used for medical imaging. In addition to the image information (the basic information), information about source reference files (the reference information), the name of an examined patient, the date of birth of this patient etc., for example, are stored. The need for the reference information in medical imaging arises when original images must be filtered, for example. In this way, a derived image results; a further example of derived images are "parameter images" which contain functional information.

FIG. 2 schematically shows the formation of such a derived image D. The source reference files are anatomic magnetic resonance images A, B and C, for example, which have been acquired by a magnetic resonance device and originate from the same measurement or from different measurements. The three anatomic magnetic resonance images A, B and C are combined to form a derived image D; they may potentially be weighted.

In addition to the above-described derived image D, the data file 1 represents two further derived images E and F whereby the derived image E is based on the anatomic images B and C, and the derived image F is based on the anatomic images A and B and on the derived image E. As a corresponding entry in their reference information 5D, 5E, 5F, the derived images D, E and F include information about the links to their source reference files. For example, in the case of the derived image F, these are the anatomic images A and B and the derived image E. References to the source reference files can possibly also be provided, for example, to the anatomic images B and C for the derived image E. Anatomic images A, B, C do not contain reference information since they are directly based on magnetic resonance measurements.

The method explained in FIG. 1 refers to a representation of the file structure 1, either partially or as a whole, on a display device. This occurs with the assistance of an intelligent tree structure which represents links between respective files of the file structure. This is referred to as a link tree structure or concatenation tree structure 9 in the following and is shown in an imaging window 7.

The concatenation tree structure 9 is created, for example, as follows. Initially, a file of the file structure 1 is selected 11. The file D, for example, is selected in FIG. 1. The selection 11 can occur, for example, with the assistance of the alphabetically organized representation of the file structure. Subsequently, the source reference files are identified as shown at 13. For this purpose, the reference information of the file D is evaluated.

The file names of the selected file and of the identified files are subsequently incorporated into the link or concatenation tree structure and are at the same time displayed or shown as emphasized or accentuated entries. The emphasis can be provided by a (colored) background of the files, by (colored) selection frames, and/or by underlining, for example. FIG. 1 shows a visual accentuation 15 for the selected file D and its source reference files A, B and C. FIG. 1 schematically shows the accentuation or emphasis by the frame. In addition, a parting line has been incorporated into the display window 7 whereby this parting line differentiates between the selected file D and the source reference files A, B, C.

For example, icons or miniaturized representations (thumbnail images) of the basic information of the files can be used in the concatenation tree structure 9.

FIG. 3 shows an extended flow diagram for illustrating the repetition of the method following the operating sequence described in FIG. 1. The derived image F is selected in a second selection step. According to an embodiment of the inventive method, the source reference files are automatically identified, which in the example include i.e., the anatomic images A and B and the derived image E. The selected derived image F is displayed in the concatenation tree structure following the derived image D. In addition, the additional derived image E is displayed in the area of the source reference files. The derived image F, the anatomic images A and B and the derived image E are accentuated. In a more detailed embodiment, the source reference files of the derived image E, which in the illustration include i.e., the anatomic images B and C, are displayed in a sub-concatenation or further branch of the tree attached to the derived image E for representation purposes. In this way, the dependency of the derived images on an arbitrary number of levels of source reference files can be made clear.

Furthermore, FIG. 3 schematically shows a representation of the basic information of the selected derived image F and of the referenced images A, B and E. On the basis of the concatenation tree structure 9, a driving or control 17 of a second display window 19 occurs. Two display areas 21, 23 are arranged in the display window 19. In FIG. 3, the images of the file structure represent tomograms through a head, for example. This image information, which is stored as basic information 3A-F, is shown in the two display areas 21, 23.

The basic information 3F of the derived image F is shown in the display area 21 and the basic information 3A of the anatomic image A is shown in the display area 23. In the display area 23, the image information 3B and 3E can be brought to the foreground by clicking on the upper right image corner.

The anatomic images A, B and C can be seen in the display area 23 by switching from the derived image F back again to the derived image D.

On the other hand, if the anatomic image A, for example, is selected in the procedure, source reference files, which could be represented in the display area 23, are not present.

FIG. 4 shows a display window 19' having four display areas S1-S4. A loading into the display area S1 occurs by selecting 11 the derived image D', for example. In contrast to the derived image D, the derived image D' has been generated from a number of anatomic multi-slice pickups A', B', C'. Multi-slice pickups consist of series of magnetic resonance images which have been picked up spatially or chronologically offset to one another, for example. Normally, such multi-slice pickups are represented as a group of magnetic resonance images that can be browsed through. FIG. 4 shows such a representation on the basis of the four schematically shown slices A'1-D'3.

The derived image D' is generated, for example, in that the images of the multi-slice pickups A', B', C' are combined with one another in the same spatial position. In order to evaluate the derived image D', it is advantageous that, dependent on the section of the derived image D' shown in the display area S1, the corresponding sections A'1-C'3 of the anatomic multi-slice pickups A', B' C' are represented in the foreground in the respective display areas S1, S2, S3. The automatic representation of slices at the same spatial position makes it possible to compare the different shown images more quickly.

On the basis of the concatenation tree structure, the representations are shown in the display window 19' in an always updated fashion according to an embodiment of the inventive method. As shown in FIG. 4, if the viewer selects the slice D'2 of the derived image D', for example, the slices A'2, B'2 and C'2 of the multi-slice pickup A', B', C' are also displayed in the foreground.

Figure 5:
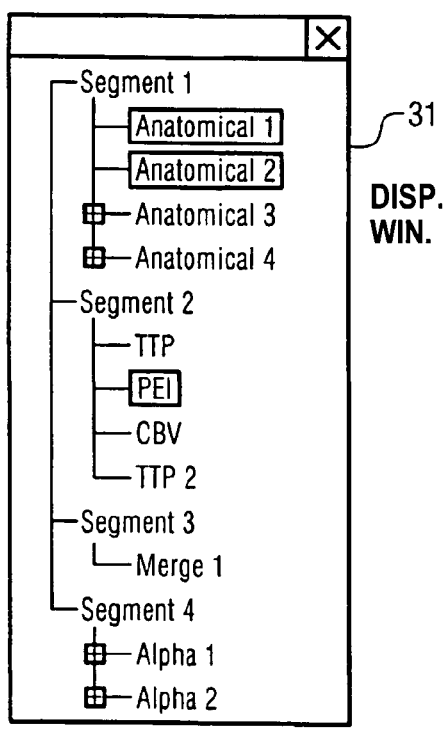
FIG. 5 is a pictorial diagram or screen shot of a display showing an exemplary link tree structure as applied to the field of magnetic resonance tomography.

FIG. 5 shows a display window 31 as it could be used for operating a magnetic resonance apparatus. The partitioning of the link or concatenation tree structure into the segments 1 to 4 and the respective magnetic resonance images allocated to the segments are shown. The images Anatomical 1 and Anatomical 2 and the multi-slice pickups Anatomical 3 and Anatomical 4 are allocated to the segment 1. Segment 2 shows the derived images TTP, PEI, CBV and TTP2. Segment 3 shows the derived image Merge 1 and segment 4 shows two derived multi-slice pickups Alpha 1 and Alpha 2. The multi-slice pickups are marked with a symbol, e.g., a cross in a box on the basis of which a further branch of the tree structure can be popped up.

In FIG. 5, the derived image PEI in segment 2 is used as an example and provided with a frame. On the basis of an embodiment of the method, the corresponding source reference files—the images Anatomical 1 and Anatomical 2 in this case—are also provided with a frame.

Figure 6:
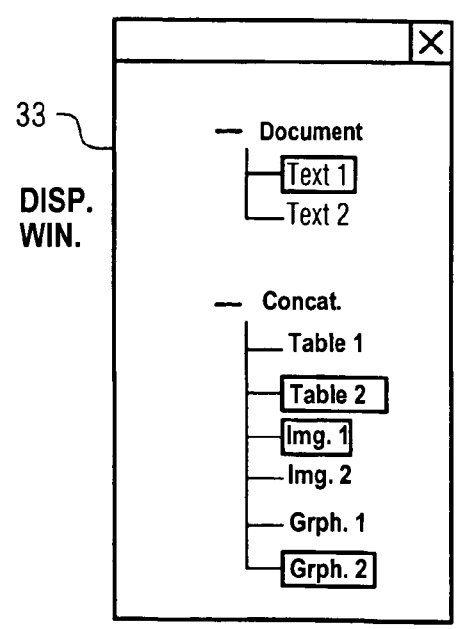
FIG. 6 is a pictorial diagram or screen shot of a display showing an exemplary link tree structure as applied to the field of text processing programs.

FIG. 6 shows a display window 33 having a concatenation tree structure as it could be used in the case of a text document. The concatenation tree structure is divided into the documents (text 1 and text 2) and sources (table 1 and table 2, image 1 and image 2, and graphic 1 and graphic 2) from which the text document is derived. The document text 1 is selected in FIG. 6 and can be recognized by the frame. The source reference files table 2, image 1 and graphic 2 are simultaneously accentuated by a frame.

The exemplary embodiments can be integrated into a user interface control element. The control element can be used for displaying source resonance imaging files in a display area on the basis of drag and drop and to open with a corresponding computer program by double-clicking on the respective entry in the link concatenation tree structure.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

REFERENCE CHARACTER LIST 1 file structure
3A basic information
5A reference information
7 display window
9 concatenation or link tree structure
11 selection
13 identification
15 representation and accentuation
17 driving or control
19, 19' display window
21, 23, S1, ... S4 display window
31, 33 display window
A, B, C anatomic image
D, E, F derived image
A', B', C' anatomic multi-slice pickup
D' derived multi-slice pickup
D'1 slices of multi-slice pickups

What is claimed is:

1. A method for controlling a display device to display image information of files of a medical examination apparatus on a first and second display area in the display device, comprising the steps of:
generating a concatenated file by processing source reference files obtained from a medical examination apparatus, the concatenated file being generated by combining information derived from a plurality of the source reference files, the concatenated file being generated using a microprocessor running a computer program, the concatenated file comprising a file structure containing basic information and reference information, the reference information containing information linking the concatenated file with its source reference files;
selecting the concatenated file by a user;
automatically identifying the source reference files of the concatenated file with the assistance of the reference information using a microprocessor running a computer program after the selecting of the concatenated file; and
providing a visual representation in the first display area of the display unit of the concatenated file and a visual representation of source reference files in the second display area of the display unit, said visual representation of the source reference files including a visual accentuation of the source reference files of the concatenated file.

2. The method according to claim 1, further comprising the step of: utilizing a tree structure for the representation and accentuation of the source reference files.

3. The method according to claim 1, further comprising the step of: utilizing at least one of color and underlining for the accentuation.

4. The method according to claim 1, wherein the basic information is image information of a picked-up anatomic image of a medical examination device.

5. The method according to claim 4, wherein the basic information is image information of a derived image of a medical examination device generated from one or more anatomic images.

6. The method according to claim 4, wherein the basic information is image information of a derived image of a medical examination device generated from one or more of images selected from the group consisting of anatomic images and derived images.

7. The method according to claim 4, wherein at least one of anatomic images and derived images have a DICOM standard format.

8. The method according to claim 1, further comprising the steps of: grouping the files into file series.

9. The method according to claim 8, wherein the file series are anatomic multislice pickups or parameter multislice pickups of a medial examination device.

10. The method according to claim 2, wherein the representation and the accentuation occurs outside of the tree structure.

11. The method according to claim 2, further comprising the step of: controlling the first and second display areas of the display unit with the tree structure.

12. The method according to claim 11, further comprising the steps of:
representing, in an automatically updated fashion in the first display area, the basic information of the selected concatenated file; and
representing, in an automatically updated fashion in the second display area, the basic information of the corresponding source reference files.

13. The method according to claim 11, wherein the second display area is divided into sub-display areas.

14. A method as claimed in claim 1, wherein said step of generating a concatenated file generates an image based file formed by joining a plurality of source image files,
said step of providing a representation of the source reference files includes displaying the source image files on the display.

15. A method for controlling a display unit to display image information of files of a medical examination apparatus on a first and second representation region of the display unit, comprising the steps of:
generating a concatenated file by concatenating source images of source image files using a microprocessor running a computer program to form a concatenated image, the concatenated image being formed by combining information from a plurality of source images file including the concatenated image as basic information and including information on the source image files, the information on the source image files including information of a data structure of the source image files;
receiving a selection of the concatenated file by a user;
automatically identifying the source image files of the selected concatenated file using a microprocessor running a computer program;
displaying a representation of the selected concatenated file on the display device;
displaying a tree structure on the display device, said tree structure including a representation of source images which were concatenated to form the concatenated image of the concatenated file, said tree structure including accentuation of the source images that were concatenated to form the concatenated image.

16. A method as claimed in claim 15, wherein said source images include slice images generated by a computer tomography device and said concatenated image is a multi-slice computer tomography image obtained by concatenation of the source images.

17. A method as claimed in claim 15, wherein said source images are anatomic images, and wherein said concatenated image is a derived image obtained by concatenating the anatomic images.

18. A method as claimed in claim 15, wherein at least one of the source images is a concatenated image generated from source images, and further comprising the steps of:

indicating on the display that the concatenated source image is a concatenated image, and displaying a tree structure representing source images of the concatenated source image.

19. A method for controlling a display device to display image information of files of a medical examination apparatus on first and second image display regions of the display device, comprising the steps of:

generating a concatenated image file by combining information from the plurality of source image files, wherein the concatenated image file is one of a magnetic resonance tomography image file or a computer tomography image file, at least some of the source image files being anatomic images of a patient obtained by a medical imaging apparatus, the concatenated image file being an image file of a portion of the patient's anatomy, said step of generating using a microprocessor running a computer program to derive the concatenated image file;

receiving a selection of the concatenated image file by a user as a selected file;

automatically determining which source image files were combined to generate the selected file, said automatic determining step being performed by a microprocessor running a computer program;

displaying a representation of the selected image file in a first image area of the display device;

displaying a tree structure in a second image area of the display device, said tree structure including representations of source image files; and accentuating the plurality of source image files from which the selected file was generated, the accentuated source image files being represented on the tree structure in the second image area.

* * * * *